(12) United States Patent
Kaputin (10) Patent No.: US 7,051,011 B2
(45) Date of Patent: May 23, 2006

(54) DEVICE CONTROLLER (75) Inventor: John Alan Kaputin, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/324,778

(22) Filed: Dec. 18, 2002

(65) Prior Publication Data
US 2004/0039460 A1    Feb. 26, 2004

(30) Foreign Application Priority Data
Aug. 23, 2002   (GB)   ................... 0219662.4

(51) Int. Cl.
*G06F 17/00*    (2006.01)
*G06N 5/05*     (2006.01)
*G05B 13/02*    (2006.01)

(52) U.S. Cl. .................. 706/47; 700/49; 700/47

(58) Field of Classification Search .................. 706/47
See application file for complete search history.

(56) References Cited
U.S. PATENT DOCUMENTS 4,112,342 A * 9/1978 Elliott ................. 318/599

4,972,365 A * 11/1990 Dodds et al. ................. 710/5
6,577,963 B1 * 6/2003 Cordray et al. ............... 702/65
2004/0019877 A1 * 1/2004 Berkowitz et al. .......... 717/117

OTHER PUBLICATIONS

Fastgate System—Module Level Design: GATE, John Kaputin May 28, 1998 pp. 1-36.
Fastgate System—Module Level Interface: GATE, John Kaputin, May 28, 1998 32 pages.
Director Series II and IV, Year 2000 Readiness Disclosure ARCOM Control systems, pp. 1-5 http://www.arcomcontrols.com/products/pcp/pcp9.htm.

* cited by examiner

*Primary Examiner*—Anthony Knight
*Assistant Examiner*—Michael B. Holmes
(74) *Attorney, Agent, or Firm*—Duke W. Yee; Herman Rodriquez; Wayne P. Bailey (57) ABSTRACT

Disclosed is apparatus for controlling devices comprising a data structure representing devices to be controlled; means for controlling the state of the device controller; means for dynamically determining the current sub-state within a state of the device controller; means for controlling the physical state of a controlled device; and a rules database having rules to be executed by the apparatus, the rules database having rules corresponding to a plurality of states and sub-states of said device controller.

7 Claims, 2 Drawing Sheets

DEVICE CONTROLLER

FIELD OF THE INVENTION

The present invention relates to device controller software and in particular to device controllers that support configurations and/or usage requirements of input and output devices which change over time.

BACKGROUND OF THE INVENTION

Device controllers are used in many applications where output devices need to be controlled such that their behavior is dependent on the information supplied by input devices and on rules defined for the device controller. The input devices and output devices will be referred to collectively as external devices. The device controller is told the properties and behavior of the input devices and the properties and behavior of the output devices. The device controller is additionally told the configuration of the input devices and of the output devices and the processing that is required to be done on the information supplied by the input devices in order to control the behavior of the output devices. This is typically implemented by software being written for a particular application.

If the configuration of the external devices changes, then the software must be rewritten to implement those configuration changes. Typically a change of configuration may involve the addition or deletion of external devices or a change in the characteristics of those external devices. If the logical processing that is required to be performed in response to the external devices changes, then the software must be rewritten to implement those changes in logical processing. Typically a change in logical processing may involve a change in the manner in which output devices respond to input devices. If there is a change in user requirements, then the software must also be rewritten to implement those changes in requirements. Typically a change in user requirements may involve a change in a time period that elapses between two events or the action taken by an output device in response to an input device.

A typical application of a device controller with external devices is a system for use at the entrance to a parking lot which might have a touch screen for displaying prompts or options to a driver or an operator, a machine to print tickets for the parking lot, a barrier to physically control access to the parking lot and a set of lights to indicate to the driver as to whether he can proceed or not. Another application of such a device controller might be to control an automated manufacturing "robot". The robot is operating according to a set of rules within the device controller and is responsive to information from input devices to control output devices.

Conventionally, the rules and the characteristics and configuration of the external devices are implemented directly in the software such that the software must be reprogrammed if any changes are to be made to the rules, characteristics or configuration. Such reprogramming means that the system suffers from many of the well known software maintenance problems such as:

(i) the requirement for multiple versions of the software to support differing requirements;

(ii) the difficulty in maintaining a common code base as those requirements diverge over time;

(iii) a growth in the amount of code which has to be customized;

(iv) difficulties in distributing new versions of the software efficiently and securely;

(v) dilution or loss of knowledge about the software as the number of variants increases; and (vi) associated problems in maintainability, service and service level agreements.

Supervisory Control And Data Acquisition (SCADA) devices called Programmable Logic Controllers (PLCs) use an approach of having an abstraction of the external devices and of the functions that can be performed by them, and a decoupling layer which abstracts the data representation, regardless of its source. One such SCADA device is Arcom Controls' "Director" device, details of which can be found at http://www.arcomcontrols.com/products/pcp/pcp9.htm.

Figure 1:
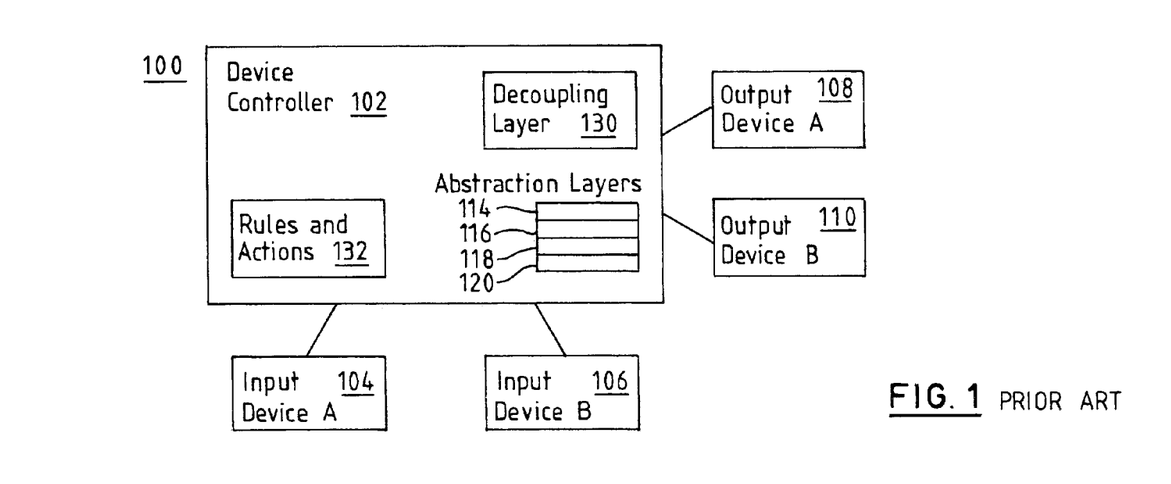
FIG. 1 shows a system including a prior art device controller with the rules and actions being hard-coded into the device controller.

FIG. 1 shows a device controller system 100 using such an approach. A device controller 102 receives input from external input devices 104, 106 and controls connected external output devices 108, 110. The device controller contains respective abstraction layers 114, 116, 118, 120 corresponding to each of the external devices together with information concerning the functions that can be performed by each of the external devices. The device controller further contains a decoupling layer 130 which abstracts the data. Rules and actions 132 are stored in the device controller and are typically implemented in a higher level "ladder logic" language such as IEC-1131 to monitor and respond to changing states in the devices, including monitoring and changing in response to time. These rules and actions are hard-coded into the device controller and in the event of updates to the rules or actions being required, the software must be rewritten.

SUMMARY OF THE INVENTION

Accordingly the invention provides apparatus for controlling devices comprising: a data structure representing devices to be controlled; means for controlling the state of the device controller; means for dynamically determining the current sub-state within a state of the device controller; means for controlling the physical state of a controlled device; and a rules database having rules to be executed by the apparatus, the rules database having rules corresponding to a plurality of states and sub-states of said device controller. The set of possible states of the device controller is controlled by the apparatus, is hardcoded and does not change. The sub-state within the state is determined by instructions contained within the application software, which is not hardcoded and does change according to the current context of the controlled device.

The rules in the rules database include action rules specifying actions to be performed on a controlled device. These rules control the devices, for example, by signaling an output device to switch on a light, operate a lock or print a ticket or by signaling an input device to start monitoring an input to detect a person or that a ticket has been taken.

The rules in the rules database include condition rules detecting a physical state of a device (ON or OFF). These rules are executed when their state and sub-state properties match those of the device controller.

BRIEF DESCRIPTION OF THE DRAWINGS

The invention will now be described, by way of example only, with reference to the accompanying drawings, in which.

DETAILED DESCRIPTION OF THE INVENTION

Figure 2:
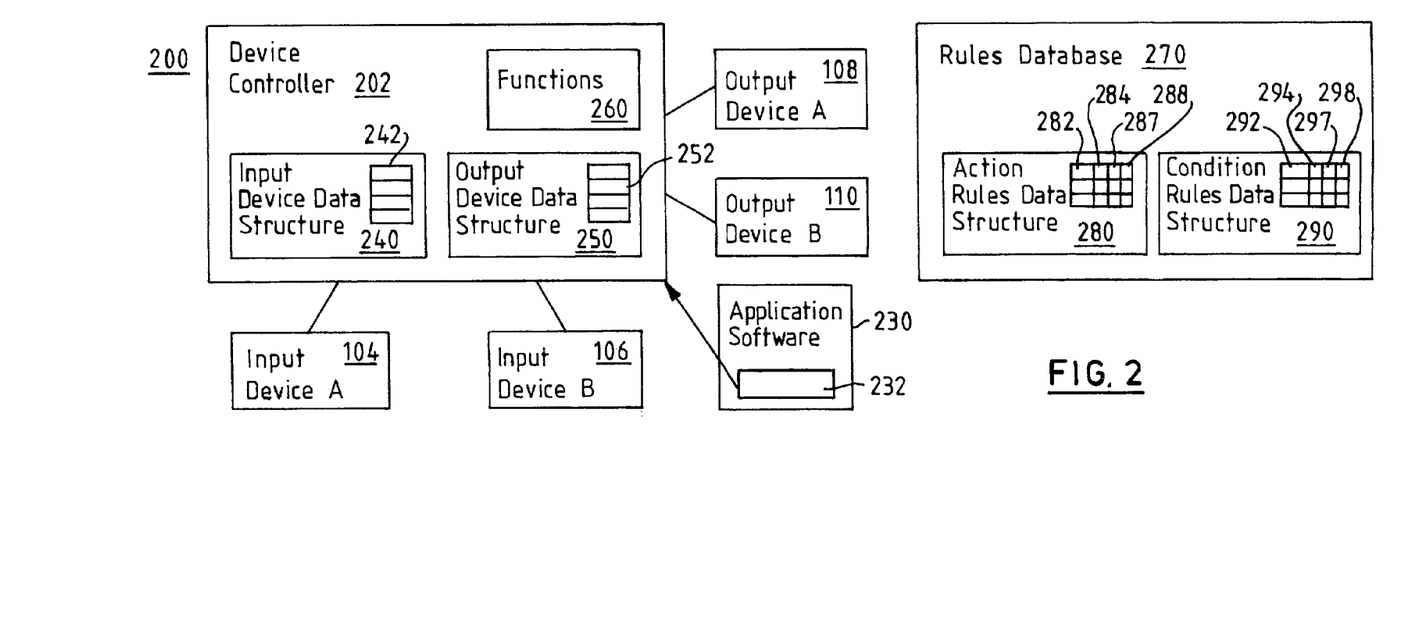
FIG. 2 shows a system, including a device controller and rules database having data structures, according to the present invention.

FIG. 2 shows a device controller system 200 according to the present invention. A device controller 202 receives input from external input devices 104, 106 and controls connected external output devices 108, 110. The device controller 202 comprises a data structure 240 (shown in FIG. 3) to represent input devices and a data structure 250 to represent output devices. The data structures contain records 242, 252, each record representing a single input device or a single output device.

Figure 3:
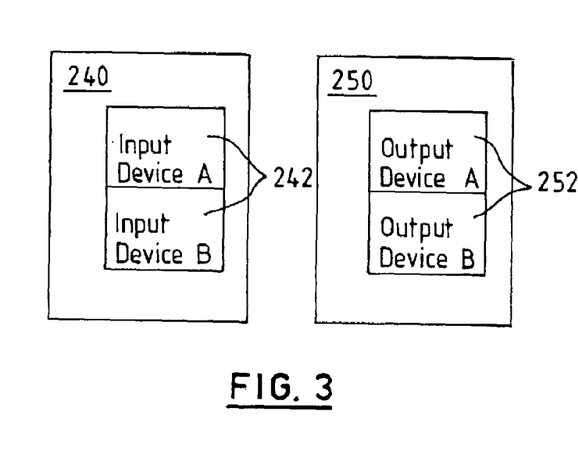
FIG. 3 shows the records in the data structures of the system of FIG. 2.

The device controller 202 initializes its device configuration from these device records 242, 252. Its device configuration enables it to know what devices are connected to it. The device controller 202 also initializes its logical device processing rules. The device controller 202 also includes functions 260 which can perform a known set of generic functions on the input devices and the output devices such as, for example, testing their state or setting their state and starting and stopping separate threads of execution for each device. However, the device controller does not have hard-coded control logic that defines how and when to invoke these functions 260.

Figure 4:
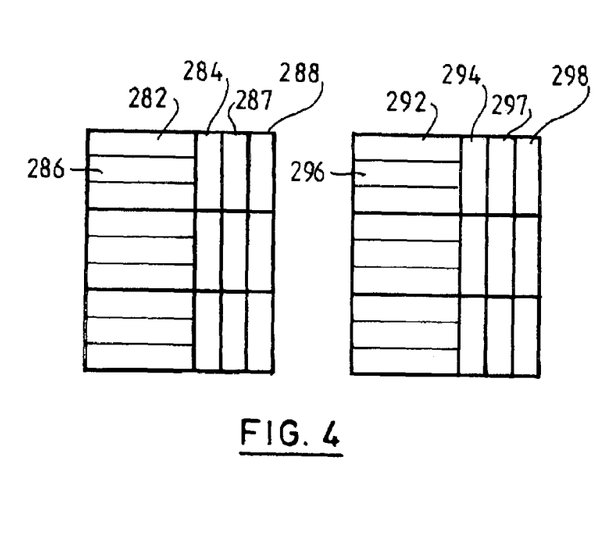
FIG. 4 shows the records in the data structures of the rules database.

A rules database 270 is associated with the device controller 202. The rules database 270 contains a data structure 280 which includes ActionRules 282 and a data structure 290 which includes ConditionRules 292. ActionRules 282 specify an action to be performed on a device 104, 106, 108, 110 such as "start a thread of execution for the device" or "switch the device off". ConditionRules 292 detect the state of a device 104, 106, 108, 110, for example, is the device switched off? Each ActionRule 282 and each ConditionRule 292 includes a data element called PostAction 284, 294 which specifies the next logical step. PostAction 284 in an ActionRule 282 specifies what to do after the action specified in the ActionRule 282 has been completed. PostAction 294 in a ConditionRule 292 specifies what to do if the condition specified in the ConditionRule 292 evaluates to be true. Examples of the next logical steps defined by PostAction 284, 294 include "continue to the next rule", "stop processing the rules and return control" and "stop and return an error condition". Each ActionRule 282 and each ConditionRule 292 includes the data elements State 287 and Sub-state 288 which determine when the rule should be executed by the device controller 202.

Each ActionRule 282 and each ConditionRule 292 applies to a specific device 104, 106, 108, 110. Each of the devices must be defined in the data structures 240, 250 in the device controller 202. The ActionRules 282 and ConditionRules 292 (see FIG. 4) represents the steps to be performed on one or more of the devices 104, 106, 108, 110. By constructing the sets of records 280, 290 the device control logic required for any device configuration can be specified.

To determine when to execute the device control logic constructed from records 280, 290, the device controller 202 uses its properties State and Sub-state and the instruction 232 in application software 230 used to invoke the device controller 202. States are hardcoded in the software of the device controller 202. Sub-states are determined dynamically by the device controller 202. The instruction 232 may represent one of the hardcoded states, in which case the device controller 202 changes to that new state and sets its sub-state to represent the initial sub-state for that state. If the instruction 232 does not represent a state, the device controller dynamically determines if the instruction 232 represents a sub-state within the current state and sets the sub-state accordingly. Once the state and sub-state have been determined, the device controller 202 executes any Action-Rule 282 or ConditionRule 292 whose state 287 and sub-state 288 match the state and sub-state of the device controller 202, as determined from the invocation instruction 232.

Figure 5:
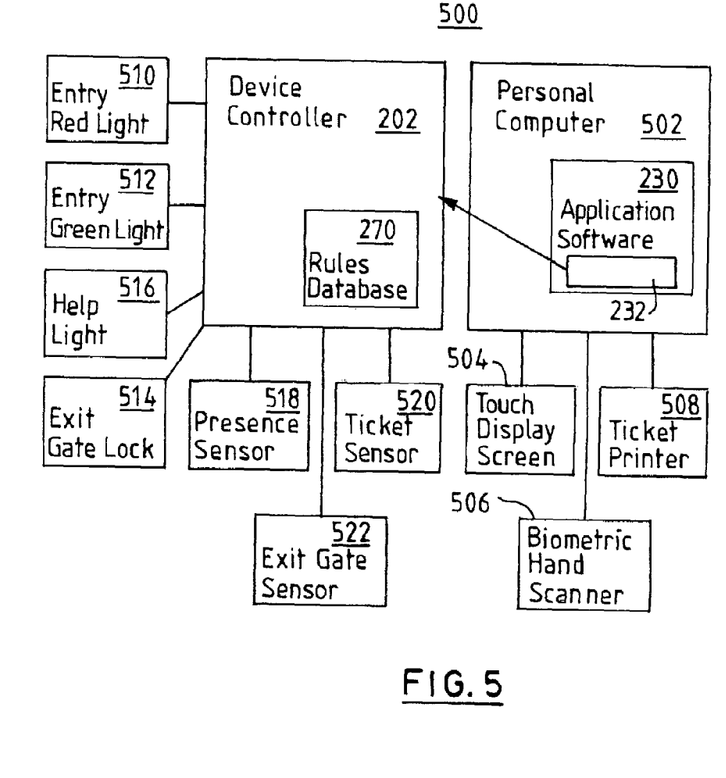
FIG. 5 shows a particular embodiment of the present invention implementing a kiosk application.

A particular exemplary embodiment of the device controller of FIG. 2 will now be described with reference to FIG. 5. The embodiment described is the gate portion of an automated, unmanned, kiosk application intended for immigration control and passenger clearance at airports and other border control points. The gate portion must get users to enter the kiosk area, keep them at the kiosk during processing and get them to exit the kiosk when processing is successfully completed or keep them at the kiosk if an error occurs and officer intervention is required. In an embodiment, red 510 and green 512 entry and exit (not shown) lights are used to instruct users when to enter or when to leave the kiosk. In another embodiment, where physical control of passenger movement is a strong concern, red and green entry lights may be used to instruct users when to enter the kiosk, instead of exit lights, a physical locked exit barrier 514 is used to prevent users from passing through until successfully processed. A flashing help light 516 is used to signal when an officer is needed at the kiosk. Sensors are used to detect 518 user movement up to or away from the kiosk and to detect 520 events at the kiosk, such as a ticket being taken from a ticket dispenser 508.

Users, typically frequent business travelers, first register with the system by providing identification details, for example, using a smart card or credit card, and a sample biometric scan of their hand which is stored for authentication purposes. On arriving at the border control point, the user approaches the kiosk, inserts their ID card into the kiosk and places their hand on the scanner 506. On successful authentication of the user, the kiosk application interrogates any required back-end immigration or other government systems and if it receives an approval from such systems, prints 508 a ticket for the user. The user takes the ticket and proceeds past the kiosk.

The Kiosk Gate receives instructions from the kiosk software for controlling user movement such as instructing the next user to enter or instructing the processed user to exit. These instructions are determined by the kiosk software and depend on business rules, processing and outcomes. When the kiosk gate receives instructions from the kiosk software, the kiosk gate is a passive receiver of messages and merely provides instructions to the device controller. Expected user events (such as that a user has entered the kiosk) may be detected by devices and reported back to the kiosk gate.

The kiosk gate can also use its input devices to detect unexpected user events and to send unsolicited messages to the kiosk software to report these unexpected user events. In this case, the kiosk gate is an active messenger sender, not just a passive receiver. Examples of this are if a user walks away or if a user forces open the exit gate before being processed successfully. When these are reported back to the kiosk, it may take appropriate action, such as to instruct the gate to close its entry and exit mechanisms and to start flashing the help light.

TABLE 1

Input device data structure (240 in FIG. 2)

| Device Type | Device Code | Device Description |
|---|---|---|
| I | PRESEN | presence sensor |
| I | TKTSEN | ticket sensor |
| I | EXGSEN | exit gate sensor |

Table 1 above shows the contents of the input device data structure (240 in FIG. 2) for the embodiment of a kiosk application. The device type for each of the devices is "I", meaning input device. The device code allocated to a particular device is to allow it to be identified. Either a device code may be used or a number may be used. This code or number must match the device identifier used in the rules. A brief description of the device is given. The device description is optional, but does assist with development and maintenance of the software. The device numbers do not have to start from 0, or even be sequential, they are merely to identify the devices.

In Table 1, there are three input devices defined, one for detecting the presence of a person at the kiosk, one for detecting whether or not a ticket which is present in the ticket printer has been removed by the person and one for detecting whether the exit gate is open or closed. In a kiosk application, other sensors may be used or alternatives to the sensors described may be used. In other applications of the present invention, a totally different set of sensors may be used, according to the requirements of the application.

TABLE 2

Output device data structure (250 in FIG. 2)

| Device Type | Device Code | Device description |
|---|---|---|
| O | ENTRED | entry red light |
| O | ENTGRN | entry green light |
| O | HELPLT | help light |
| O | EXGLCK | exit gate lock |

Table 2 above shows the contents of the output device data structure (250 in FIG. 2) for the embodiment of a kiosk application. The device type for each of the devices is "O", meaning output device. The device number is allocated to a particular device to allow it to be identified. A brief description of the device is given. The device description is optional, but does assist with development and maintenance of the software. The device numbers do not have to start from 0, or even be sequential, they are merely to identify the devices.

In Table 2, there are four output devices defined, one red light at the entrance to the kiosk for indicating to the person that they should not enter the kiosk, one green light at the entrance to the kiosk for indicating to the person that they can enter the kiosk, one light for indicating that the user requires help and one lock for locking the exit gate from the kiosk. In a kiosk application, other output devices may be used or alternatives to the output devices described may be used. In other applications of the present invention, a totally different set of output devices may be used, according to the requirements of the application.

TABLE 3

Action Rules data structure - part 1 of 8

| Rule Type | State | Sub-state | Step | Rule Device | Action | Post Action | Comment |
|---|---|---|---|---|---|---|---|
| A | GATE | 0 | 01 | PRESEN | CREATE | 000200 CN | create presence sensor thread |
| A | GATE | 0 | 02 | EXGSEN | CREATE | 000200 CN | create exit gate sensor thread |
| A | GATE | 0 | 03 | TKTSEN | CREATE | 000100 CN | create ticket sensor thread |
| A | GATE | 0 | 04 | ENTRED | CREATE | 000500 CN | create entry red light thread |
| A | GATE | 0 | 05 | HELPLT | CREATE | 000500 CN | create help light thread |

In Table 3, a portion of the rules database is shown. The rule type for these rules is shown as A, that is they are all actions. Action rules execute the contents of the rule. The kiosk gate may be in a number of states (GATE, HELP, ENTRY, ATGATE, EXIT, CLOSE and SHUT in the kiosk gate application described). The GATE state is the physical startup or termination of the KioskGate device controller. In this example, "GATE" state and sub-state "0" refers to startup or initialization rules. Changes from state to state in the kiosk gate are made when the kiosk gate is requested by the kiosk controlling software to change to a particular state. The state to which each rule applies is shown under "State". Within each State, there may be a number of sub-states. In the presently described embodiment, sub-state 0 is used to describe those actions which are taken when a state is first entered. All of the steps in the portion of the action rules data structure described in Table 3 are sub-state 0, that is the initialisation sub-state. There are five rules described in Table 3, all of which create threads that control each of the input and output devices. The threads PRESEN, EXGSEN, TKTSEN, ENTRED and HELPLT are all created by these rules. The number (00200) is the number of milliseconds the device controller will wait before repeating its instruction to the device thread (for example, polling an input device or turning an output device on or off). In step 1 of Table 3, this represents the sleep time in milliseconds for polling of the device thread by the device controller, that is, the presence sensor is polled every 200 milliseconds. The Post Action for these rules is shown as CN, which means that once the rule has been executed, processing should CoNtinue (CN) to the next rule.

and for processing to continue according to the Post Action specified. The HELP state is when assistance is required at the kiosk. The first five steps in the portion of the rules data structure described in Table 5 are sub-state 0, that is initialisation sub-states. The last rule is sub-state 9, which is used to indicate an error condition.

In sub-state 0, step 01 instructs the device controller to flash the entry red light and then continue processing to the

TABLE 4

Action Rules data structure - part 2 of 8

| Rule Type | State | Sub-State | Step | Rule Device | Action | Post Action | Comment |
|---|---|---|---|---|---|---|---|
| A | GATE | 1 | 01 | PRESEN | KILL | CN | kill presence sensor thread |
| A | GATE | 1 | 02 | EXGSEN | KILL | CN | kill exit gate sensor thread |
| A | GATE | 1 | 03 | TKTSEN | KILL | CN | kill ticket sensor thread |
| A | GATE | 1 | 04 | ENTRED | KILL | CN | kill entry red light thread |
| A | GATE | 1 | 05 | HELPLT | KILL | CN | kill help light thread |

In Table 4, a portion of the rules database is shown. The rule type for these rules is shown as A, that is they are all actions. The GATE state is the physical startup or termination of the KioskGate device controller. In this example, "GATE" state and sub-state "1" refers to termination. All of the steps in the portion of the action rules data structure described in Table 4 are sub-state 1, that is the next sub-state after initialisation (sub-state 0). Sub-state 1 processing is done when a message is received from the kiosk software requesting the processing of the sub-state 1 rules. There are five rules described in Table 4, all of which kill threads that control each of the input and output devices. The threads PRESEN, EXGSEN, TKTSEN, ENTRED and HELPLT are all killed by these rules.

next step. Step 02 instructs the device controller to flash the help light and to RL (Reply Later), that is that the reply to this request will be an asynchronous response. On the RL post-action, processing of rules stops but no reply is sent to the device controller. When some event triggers the next invocation of the device controller, the next rule, step 03 is executed. Step 03 instructs the device controller to check if the presence sensor is in an OFF state, which indicates that a user has gone. If the presence sensor is in an off state, processing continues to the next rule. Step 04 instructs the device controller to stop flashing the entry red light and then continue to the next rule. Step 05 instructs the device controller to stop flashing the help light and then to send an asynchronous reply (AS). This is the reply for step 02 which

TABLE 5

Action and Conditional Rules data structure - part 3 of 8

| Rule Type | State | Sub-State | Step | Rule Device | Action | Post Action | Comment |
|---|---|---|---|---|---|---|---|
| A | HELP | 0 | 01 | ENTRED | START | 000000 CN | flash entry red light |
| A | HELP | 0 | 02 | HELPLT | START | 000000 RL | flash help light |
| C | HELP | 0 | 03 | PRESEN | OFF | CN | user has gone |
| A | HELP | 0 | 04 | ENTRED | STOP | CN | stop flashing |
| A | HELP | 0 | 05 | HELPLT | STOP | AS | stop flashing, reply to RL |
| C | HELP | 9 | 01 | EXGSEN | OFF | RE | exit gate forced open |

In Table 5, a portion of the rules database is shown. The rule type for four of these rules is shown as A, that is they are actions and for two of these rules is shown as C, that is they are conditions. For condition rules, the input device must be in the specified state for the condition to be satisfied had "Reply Later" (RL) as its Post Action. This asynchronous reply to the device controller indicates that the rules execution started with step 01 is now complete.

In sub-state 9, step 01 instructs the device controller that if the exit gate sensor (EXGSEN) goes to an OFF state (the exit gate has been forced open) then an Exception is to be Reported (RE).

In this embodiment, each rule is executed only once and cannot be executed again on subsequent invocations of the device controller until the rule has been explicitly reset. In this way, multiple invocations of the device controller over the same set of rules do not need to distinguish which rules have already been executed and which are left still to be executed. The device controller just tries all rules in the set and those that have already been executed will be ignored.

instructs the device controller to start the exit gate sensor (EXGSEN) and then without waiting for a response, to continue to the next rule. Step 03 instructs the device controller to turn off the entry red light (ENTRED) and continue to the next rule. Step 04 instructs the device controller to turn on the entry green light (ENTGRN) and that the reply will be asynchronous (RL)—reply later. Step 05 instructs the device controller to check if the presence sensor is in an ON state, which indicates that a user has

TABLE 6

Action and Conditional Rules data structure - part 4 of 8

| Rule Type | State | Sub-State | Step | Rule Device | Action | Post Action | Comment |
|---|---|---|---|---|---|---|---|
| A | ENTRY | 0 | 01 | PRESEN | START | 000000 CN | start sensing user presence |
| A | ENTRY | 0 | 02 | EXGSEN | START | 000000 CN | start sensing exit gate |
| A | ENTRY | 0 | 03 | ENTRED | OFF | CN | |
| A | ENTRY | 0 | 04 | ENTGRN | ON | RL | wait for user to enter |
| C | ENTRY | 0 | 05 | PRESEN | ON | CN | user has entered |
| A | ENTRY | 0 | 06 | ENTRED | ON | CN | |
| A | ENTRY | 0 | 07 | ENTGRN | OFF | AS | reply to RL (Step 04) |
| C | ENTRY | 9 | 01 | EXGSEN | OFF | RE | exit gate forced open |

In Table 6, a portion of the rules database is shown. The rule type for six of these rules is shown as A, that is they are actions and for two of these rules is shown as C, that is they are conditions. The ENTRY state is when the input and output devices are set to instruct the next user to enter the kiosk. The first seven steps in the portion of the rules data structure described in Table 6 are sub-state 0, that is initialisation sub-states. The last step is sub-state 9, which is used to indicate an error condition.

In sub-state 0, step 01 instructs the device controller to start the presence sensor (PRESEN) and then without waiting for a response, to continue to the next rule. Step 02 entered. If the presence sensor is in an on state, processing continues to the next rule. If the condition is not satisfied, rules processing stops. Step 06 instructs the device controller to turn on the entry red light and then continue to the next rule. Step 07 instructs the device controller to turn off the entry green light and then send an asynchronous reply (AS) that corresponds to the Reply Later (RL) Post Action from step 04.

In sub-state 9, step 01 instructs the device controller that if the exit gate sensor (EXGSEN) goes to an OFF state (the exit gate has been forced open) then an Exception is to be Reported (RE) back to the device controller.

TABLE 7

Action and Conditional Rules data structure - part 5 of 8

| Rule Type | State | Sub-State | Step | Rule | | Post Action | Comment |
|---|---|---|---|---|---|---|---|
| A | ATGATE | 1 | 01 | TKTSEN | START | 010000RL | sub-state 1 (WAIT_FOR_TICKET) |
| C | ATGATE | 1 | 02 | TKTSEN | OFF | CN | ticket taken |
| A | ATGATE | 1 | 03 | TKTSEN | STOP | | AS reply to RL (step 1) |
| C | ATGATE | 9 | 01 | PRESEN | OFF | RE | user left unexpectedly |
| C | ATGATE | 9 | 02 | EXGSEN | OFF | RE | exit gate forced open |

In Table 7, a portion of the rules database is shown. The rule type for two of these rules is shown as A, that is they are actions and for three of these rules is shown as C, that is they are conditions. The ATGATE state is when a user is waiting at the gate. The first three steps in the portion of the rules data structure described in Table 7 are sub-state 1. The last step is sub-state 9, which is used to indicate an error condition. Note that there are no sub-state 0 rules for the ATGATE state. This means that there are no initialisation rules to be executed when the kiosk gate transitions to this state.

In sub-state 1, step 01 instructs the device controller to start the ticket sensor (TKTSEN) and indicate that the reply will be asynchronous (RL)—reply later. Rules processing stops until the next invocation of the device controller, when processing proceeds at step 02. Step 02 instructs the device controller to check if the ticket sensor is in an OFF state, which indicates that a ticket has been taken. If the ticket sensor is in an OFF state, processing continues to the next rule. Step 03 instructs the device controller to STOP the ticket sensor and then do the asynchronous reply for step 01 (Post Action for step one was RL).

In sub-state 9, step 01 instructs the device controller that if the presence sensor (PRESEN) goes to an OFF state (the user has left unexpectedly) then an Exception is to be Reported (RE). Step 02 instructs the device controller that if the exit gate sensor (EXGSEN) goes to an OFF state (the exit gate has been forced open) then an Exception is to be Reported (RE).

are actions and for three of these rules is shown as C, that is they are conditions. The EXIT state is when the input and output devices are set to instruct the user to leave after being processed. All five of the steps in the portion of the rules data structure described in Table 8 are sub-state 0, that is initialisation sub-states.

In sub-state 0, step 01 instructs the device controller to turn the external gate lock off to allow the user to leave and then to indicate that the reply will be asynchronous (RL). Gate processing stops at this point until the device controller is invoked again by the kiosk software, at which point step 02 will be the next rule to execute. Step 02 instructs the device controller to check if the exit gate sensor is in an OFF state, that is the exit gate has been opened, then continue (CN) to the next rule. Step 03 instructs the device controller to check if the presence sensor is in an OFF state, that is the user has left. If the presence sensor is in an OFF state, processing continues to the next rule. Step 04 instructs the device controller to check if the exit gate sensor is in an ON state, that is the exit gate has been shut after the user has exited the gate, then continue to the next rule. Step 05 instructs the device controller to turn the exit gate lock on and then reply asynchronously (AS) to step 01 (RL).

TABLE 9

Action Rules data structure - part 7 of 8

| Rule Type | State | Sub State | Step | Rule Device | Action | Post | Comment |
|---|---|---|---|---|---|---|---|
| A | CLOSE | 0 | 01 | ENTRED | ON | CN | |
| A | CLOSE | 0 | 02 | ENTGRN | OFF | CN | |
| A | CLOSE | 0 | 03 | EXGLCK | ON | CN | |
| A | CLOSE | 0 | 04 | PRESEN | STOP | CN | |
| A | CLOSE | 0 | 05 | EXGSEN | STOP | CN | |
| A | CLOSE | 0 | 06 | TKTSEN | STOP | CN | |
| A | CLOSE | 0 | 07 | ENTRED | STOP | CN | Stop flashing On and Off |
| A | CLOSE | 0 | 08 | HELPLT | STOP | RN | Stop flashing On and Off, Reply Now |

TABLE 8

Action and Conditional Rules data structure - part 6 of 8

| Rule Type | State | Sub-State | Step | Rule Device | Action | Post | Comment |
|---|---|---|---|---|---|---|---|
| A | EXIT | 0 | 01 | EXGLCK | OFF | RL | wait for user to leave |
| C | EXIT | 0 | 02 | EXGSEN | OFF | CN | exit gate has opened |
| C | EXIT | 0 | 03 | PRESEN | OFF | CN | user has left |
| C | EXIT | 0 | 04 | EXGSEN | ON | CN | exit gate has shut |
| A | EXIT | 0 | 05 | EXGLCK | ON | AS | reply to RL (step 2) |

In Table 8, a portion of the rules database is shown. The rule type for two of these rules is shown as A, that is they In Table 9, a portion of the rules database is shown. The rule type for all of these rules is shown as A, that is they are actions. The CLOSE state is when all input and output devices are set to close the kiosk's entry and exit points. All eight steps in the portion of the rules data structure described in Table 6 are sub-state 0, that is initialisation sub-states.

In sub-state 0, step 01 instructs the device controller to turn the entry red light ON and then continue processing to the next step. Step 02 instructs the device controller to turn the entry green light OFF and then continue processing to the next step. Step 03 instructs the device controller to turn the exit gate lock ON and then continue processing to the next step. Step 04 instructs the device controller to stop the presence sensor and then continue processing to the next step. Step 05 instructs the device controller to stop the exit gate sensor and then continue processing to the next step. Step 06 instructs the device controller to stop the ticket sensor and then continue processing to the next step. Step 07 instructs the device controller to stop the entry red light and then continue processing to the next step. Step 08 instructs the device controller to stop the help light and then to RN (Reply Now), that is to send a synchronous response.

TABLE 10

Action Rules data structure - part 8 of 8

| Rule Type | State | Sub-State | Step | Rule Device | Action | Post | Comment |
|---|---|---|---|---|---|---|---|
| A | SHUT | 0 | 01 | ENTRED | OFF | CN | Turn entry red light off and Continue |
| A | SHUT | 0 | 02 | ENTGRN | OFF | CN | |
| A | SHUT | 0 | 03 | EXGLCK | OFF | CN | |
| A | SHUT | 0 | 04 | PRESEN | STOP | CN | |
| A | SHUT | 0 | 05 | EXGSEN | STOP | CN | |
| A | SHUT | 0 | 06 | TKTSEN | STOP | CN | |
| A | SHUT | 0 | 07 | ENTRED | STOP | CN | |
| A | SHUT | 0 | 08 | HELPLT | STOP | RN | Turn help light off and Reply Now |

In Table 10, a portion of the rules database is shown. The rule type for all of these rules is shown as A, that is they are actions. The SHUT state is when the gate is shutting down, that is all input and output devices are being made inoperable. All of the steps in the portion of the rules data structure described in Table 1 are sub-state 0, that is initialisation sub-states.

In sub-state 0, step 01 instructs the device controller to turn the entry red light OFF and then continue processing to the next step. Step 02 instructs the device controller to turn the entry green light OFF and then continue processing to the next step. Step 03 instructs the device controller to turn the exit gate lock OFF and then continue processing to the next step. Step 04 instructs the device controller to stop the presence sensor and then continue processing to the next step. Step 05 instructs the device controller to stop the exit gate sensor and then continue processing to the next step. Step 06 instructs the device controller to stop the ticket sensor and then continue processing to the next step. Step 07 instructs the device controller to stop the entry red light and then continue processing to the next step. Step 08 instructs the device controller to stop the help light and then to indicate that the reply will be synchronous (RN).

TABLE 11

Instructions to invoke the Kiosk Gate device controller

| Instruction | Instruction-number | Comment |
|---|---|---|
| WAIT_FOR_ENTRY | 10 | the ENTRY state |
| USER_AT_GATE | 20 | the ATGATE state |
| WAIT_FOR_TICKET | 21 | a sub-state of ATGATE |
| WAIT_FOR_EXIT | 30 | the EXIT state |
| CLOSE_GATE | 40 | the CLOSE state |

In Table 11, a portion of the instructions 232 used by the application software 230 to invoke the Kiosk gate device controller 202 is shown. Each instruction 232 includes an instruction-number, passed to the device controller 202 as an invocation parameter. The instruction-number represents a State or a Sub-state of the device controller 202. The instruction numbers that are whole multiples of ten represent states—in the example of Table 11, 10, 20, 30 and 40 represent states. Any instruction-numbers between these "state" instruction-numbers represent sub-states of the next lowest "state" instruction-number. In the example of table 11, 21 represents a sub-state within state 20 that is, WAIT_FOR_TICKET represents a sub-state within the ATGATE state.

The device controller has all possible states and their instruction-numbers hardcoded into its software. The valid state transitions are also hardcoded—for example, a transition from the ENTRY state to the ATGATE state is valid, but a transition from the EXIT state to the ATGATE state is not valid. When the device controller 202 is invoked, it determines if a valid transition to a new state has been requested by comparing the instruction-number parameter with the hard-coded states and valid state transitions. If a valid state transition has been requested, it will change to this new state and set its sub-state to represent the initial state transition sub-state—in this embodiment, sub-state "0".

The device controller 202 does not have the sub-states hardcoded in its software, but instead the device controller 202 determines the sub-states from the instruction-number. If the instruction number does not represent one of the hardcoded states, the device controller determines if it represents a valid sub-state instead. If the instruction-number is greater than the instruction-number for the current state and less than the next highest instruction-number for a state, then the instruction-number represents a sub-state of the current state. In the example shown in Table 11, while the device controller 202 is in the ATGATE state (corresponding to instruction-number "20"), the device controller 202 may receive the WAIT_FOR_TICKET instruction with instruction-number parameter "21". The device controller 202 determines that this is between instruction-numbers "20" (ATGATE) and "30" (EXIT), indicating that it represents a sub-state of "20" (ATGATE). The device controller 202 then calculates the actual sub-state value by subtracting the current state instruction-number "20" from the instruction-number parameter "21" leaving a value of "1". The device controller 202 then sets its sub-state to "1".

Once the state and sub-state have been set using the instruction-number parameter, the device controller 202 then executes any ActionRules or ConditionRules whose state 287, 297 and sub-state 288, 298 data elements match the state and sub-state values set in the device controller 202.

While the preferred embodiments have been described here in detail, it will be clear to those skilled in the art that many variants are possible without departing from the spirit and scope of the present invention.

What is claimed:

1. Apparatus for controlling devices comprising:
a data structure representing devices to be controlled;
means for controlling the state of the device controller;
means for dynamically determining the current sub-state within a state of the device controller;
means for controlling the physical state of a controlled device; and
a rules database having rules to be executed by the apparatus, the rules database having rules corresponding to a plurality of states and sub-states of said device controller.

2. Apparatus as claimed in claim 1 wherein the rules in the rules database include action rules specifying actions to be performed on a controlled device.

3. Apparatus as claimed in claim 1 wherein the rules in the rules database include condition rules detecting a state of a device.

4. Apparatus as claimed in claim 1 wherein the rules in the rules database include initialization rules for initializing a controlled device.

5. Apparatus as claimed in claim 1 wherein the rules in the rules database include error rules for responding to an error indication from a controlled device.

6. Apparatus as claimed in claim 1 wherein each of the rules in the rules database includes a post-action to be performed on successful completion of that rule.

7. Apparatus as claimed in claim 1 wherein the means for controlling the state of the device controller is application software.

* * * * *